(12) United States Patent
Jia

(10) Patent No.: US 12,515,074 B2
(45) Date of Patent: Jan. 6, 2026

(54) TREATMENT PLANNING SYSTEM, RADIOTHERAPY SYSTEM, AND METHOD FOR TREATMENT PLANNING

(71) Applicant: OUR UNITED CORPORATION, Xi'an (CN)

(72) Inventor: Yongzhen Jia, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 258 days.

(21) Appl. No.: 18/308,571

(22) Filed: Apr. 27, 2023

(65) Prior Publication Data

US 2023/0347177 A1 Nov. 2, 2023

(30) Foreign Application Priority Data

Apr. 28, 2022 (CN) .......................... 202210461983.3

(51) Int. Cl.
*A61N 5/10* (2006.01)

(52) U.S. Cl.
CPC ........... *A61N 5/103* (2013.01); *A61N 5/1039* (2013.01); *A61N 5/1064* (2013.01); *A61N 5/1078* (2013.01); *A61N 5/1084* (2013.01); *A61N 2005/1055* (2013.01); *A61N 2005/1061* (2013.01); *A61N 2005/1074* (2013.01); *A61N 2005/1087* (2013.01); *A61N 2005/1089* (2013.01); *A61N 2005/1092* (2013.01)

(58) Field of Classification Search
CPC ........ A61N 5/10; A61N 5/103; A61N 5/1031; A61N 5/1039; A61N 2005/1041; A61N 5/1042; A61N 5/1045; A61N 5/1047; A61N 5/1048; A61N 5/1049; A61N 2005/1052; A61N 2005/1054; A61N 2005/1055; A61N 2005/1061; A61N 2005/1074; A61N 5/1077; A61N 5/1078; A61N 5/1081; A61N 5/1082; A61N 5/1083; A61N 5/1084; A61N 2005/1085; A61N 2005/1087; A61N 2005/1089
USPC .......................................................... 378/65
See application file for complete search history.

(56) References Cited

U.S. PATENT DOCUMENTS

| | | | | |
|---|---|---|---|---|
| 7,636,420 | B2 * | 12/2009 | Spies ..................... | A61N 5/103 378/65 |
| 7,831,289 | B2 * | 11/2010 | Riker ..................... | G16H 70/20 378/65 |
| 8,085,899 | B2 * | 12/2011 | Nord ...................... | A61N 5/103 378/65 |
| 8,232,535 | B2 * | 7/2012 | Olivera ................ | A61N 5/1042 250/493.1 |

(Continued)

*Primary Examiner* — Allen C. Ho
(74) *Attorney, Agent, or Firm* — Kolitch Romano Dascenzo Gates LLC

(57) ABSTRACT

Provided is a treatment planning system. The treatment planning system is configured to acquire a mode selection instruction, a first image of a subject to be treated and contour data of target tissue; select a mode corresponding to the subject to be treated from a plurality of treatment planning modes based on the mode selection instruction; and produce a treatment plan based on the mode corresponding to the subject to be treated, the first image and the contour data, wherein the plurality of treatment planning modes are configured to produce treatment plans for a plurality of treatment heads that generate different types of ray beams.

11 Claims, 3 Drawing Sheets

(56) References Cited

U.S. PATENT DOCUMENTS

| | | | | |
|---|---|---|---|---|
| 8,306,185 | B2* | 11/2012 | Bal | G16H 20/40 |
| | | | | 378/65 |
| 8,681,938 | B2* | 3/2014 | Myles | A61N 5/1049 |
| | | | | 378/65 |
| 9,731,148 | B2* | 8/2017 | Olivera | A61B 6/04 |
| 10,300,300 | B2* | 5/2019 | Hårdemark | A61N 5/1031 |
| 10,350,438 | B2* | 7/2019 | Brooks | G06N 20/00 |
| 10,449,388 | B2* | 10/2019 | Yin | A61N 5/103 |
| 10,507,337 | B2* | 12/2019 | Willcut | A61N 5/1038 |
| 10,737,117 | B2* | 8/2020 | Mori | A61N 5/1065 |
| 11,013,936 | B2* | 5/2021 | Cordero Marcos | A61N 5/1039 |
| 11,358,003 | B2* | 6/2022 | Sjölund | A61N 5/1081 |
| 11,439,846 | B2* | 9/2022 | Vik | A61N 5/1031 |
| 11,517,768 | B2* | 12/2022 | Hibbard | G06N 3/04 |
| 11,684,801 | B2* | 6/2023 | Schadewaldt | A61N 5/1038 |
| | | | | 600/1 |
| 12,076,586 | B2* | 9/2024 | Wedenberg | A61N 5/1038 |
| 12,083,358 | B2* | 9/2024 | Bengtsson | A61N 5/1038 |
| 12,115,386 | B2* | 10/2024 | Voronenko | A61N 5/1084 |
| 12,145,003 | B2* | 11/2024 | Holmberg | A61N 5/1071 |

* cited by examiner

TREATMENT PLANNING SYSTEM, RADIOTHERAPY SYSTEM, AND METHOD FOR TREATMENT PLANNING

CROSS-REFERENCE TO RELATED APPLICATIONS

This application claims priority to Chinese Patent Application No. 202210461983.3, filed on Apr. 28, 2022, and entitled "TREATMENT PLANNING SYSTEM, RADIOTHERAPY SYSTEM AND METHOD FOR TREATMENT PLANNING", the entire content of which is incorporated herein by reference.

TECHNICAL FIELD

The present disclosure relates to a treatment planning system, a radiotherapy system and a method for treatment planning.

BACKGROUND

Radiotherapy equipment is equipment for treating tumors by irradiating the tumors. At present, the radiotherapy equipment generally irradiates tumor cells by using a, B, y rays or X-rays, electron beams, proton beams and other particle beams generated by the equipment itself to achieve the purpose of killing tumor cells.

SUMMARY

Embodiments of the present disclosure provide a treatment planning system, a radiotherapy system and a method for treatment planning.

According to some embodiments of present disclosure, a treatment planning system is provided. The treatment planning system is configured to acquire a mode selection instruction, a first image of a subject to be treated and contour data of target tissue. The treatment planning system is further configured to select, based on the mode selection instruction, a mode corresponding to the subject to be treated from a plurality of treatment planning modes, wherein the plurality of treatment planning modes are configured to produce treatment plans for a plurality of treatment heads that generate different types of ray beams. The treatment planning system is further configured to produce a treatment plan based on the mode corresponding to the subject to be treated, the first image and the contour data.

In some embodiments, the plurality of treatment planning modes include a single treatment planning mode and a composite treatment planning mode. The single treatment planning mode is configured to produce a treatment plan for one treatment head, and the composite treatment planning mode is configured to produce a treatment plan for the plurality of treatment heads that generate different types of ray beams.

According to some embodiments of present disclosure, a radiotherapy system is provided. The radiotherapy system includes: an oncology information system and the treatment planning system as defined above. The treatment planning system is connected with the oncology information system, and the treatment planning system is configured to produce a treatment plan for at least one of a plurality of treatment heads of radiotherapy equipment. The oncology information system is configured to schedule the treatment plan, the oncology information system is connected with the radiotherapy equipment, and the radiotherapy equipment is configured to irradiate the subject to be treated based on the treatment plan.

According to some embodiments of present disclosure, a method for treatment planning is provided. The method is applicable to the treatment planning system as defined above. The method includes: acquiring the mode selection instruction, the first image and the contour data of the target tissue; selecting, based on the mode selection instruction, the mode corresponding to the subject to be treated from the plurality of treatment planning modes; and producing the treatment plan based on the mode corresponding to the subject to be treated, the first image and the contour data. The plurality of treatment planning modes are configured to produce treatment plans for the plurality of treatment heads that generate different types of ray beams.

According to some embodiments of present disclosure, a computer device is provided. The computer device includes a memory, a processor and a computer program stored in the memory and executable on the processor. The processor, when loading and executing the computer program, is caused to perform the method for treatment planning as defined above.

According to some embodiments of present disclosure, a non-transitory computer-readable storage medium storing a computer program stored therein is provided. The non-transitory computer program, when loaded and executed by a processor, causes the processor to perform the method for treatment planning as defined above.

According to some embodiments of present disclosure, a computer program product including one or more instructions is provided. The computer program product, when loaded and executed by a computer, causes the computer to perform the method for treatment planning as defined above.

Figure 1:
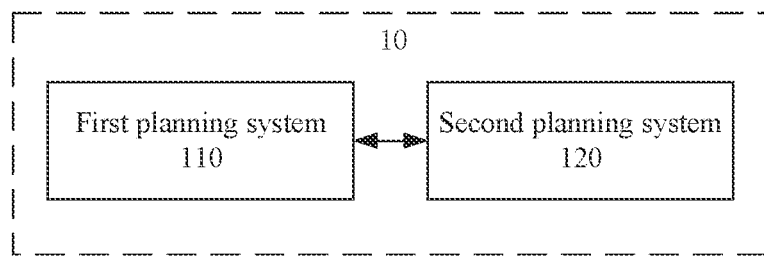
FIG. 1 is a schematic diagram of a treatment planning system according to some embodiments of the present disclosure.

Description of accompanying drawings: radiotherapy system 10, treatment planning system 100, first planning system 110, second planning system 120, oncology information system 200, contouring system 300, radiotherapy equipment 400, control system 410, imaging system 420, bus 80, processor 81, memory 82, and communication interface 83.

DETAILED DESCRIPTION

For making principles, technical solutions and advantages of the present disclosure clearer, the present disclosure is described below with reference to the accompanying drawings and embodiments. It is understandable that the specific embodiments described herein are only intended to explain the present disclosure, and are not intended to limit the present disclosure. Based on the embodiments of the present disclosure, all other embodiments acquired by those of ordinary skill in the art without creative efforts shall fall within the protection scope of the present disclosure.

The accompanying drawings in the following description are only some examples or embodiments of the present disclosure, and for those of ordinary skill in the art, under the premise of not paying creative work, the present disclosure are also applicable to other similar scenarios based on these accompanying drawings. In addition, it is understandable that although such development efforts are complex and lengthy, for those of ordinary skill in the art relevant to the content disclosed in the present disclosure, some design, manufacturing or production changes based on the technology content disclosed in the present disclosure are conventional technical means, and should not be understood as insufficient content disclosed in the present disclosure.

Reference in the present disclosure to an "embodiment" means that a particular feature, structure, or characteristic described in connection with the embodiment is included in at least one embodiment of the present disclosure. The occurrences of this term in various places in the description are not necessarily all referring to the same embodiment, nor are separate or alternative embodiments mutually exclusive of other embodiments. It is understood explicitly and implicitly by those of ordinary skill in the art that the embodiments described in the present disclosure are combined with other embodiments without conflict.

Unless otherwise defined, technical terms or scientific terms involved in the present disclosure should have general meanings understood by those with ordinary skill in the technical field to which the present disclosure belongs. Words such as "a," "an" and "the" involved in the present disclosure do not indicate a limitation on quantity, and "a," "an" and "the" indicate singular or plural numbers. The terms "comprising," "including," "having" and any variations thereof involved in the present disclosure are intended to cover non-exclusive inclusion. For example, a process, method, system, product or device that includes a series of processes or modules (units) is not limited to the listed processes or units, but further includes processes or units not listed, or furthers include other processes or units inherent to the process, method, product or device. The words "connected to," "connected with," "coupled to" and similar words mentioned in the present disclosure are not limited to physical or mechanical connection, but include electrical connection, no matter it is direct or indirect. "Plurality" involved in the present disclosure refers to two or more than two. "And/or" describes an association relationship of associated objects, indicating three types of relationships. For example, "A and/or B" indicates: A exists alone, A and B exist simultaneously, and B exists alone. The character "/" generally indicates that the contextual objects are of an "or" relationship. The terms "first," "second," "third" and the like involved in the present disclosure are only intended to distinguish similar objects, and do not represent a specific ordering of objects.

The solution provided in the present disclosure are described hereinafter.

Radiotherapy equipment is equipment that treats tumors by irradiating the tumors. At present, the radiotherapy equipment generally irradiates tumor cells by using a, B, y rays or X-rays, electron beams, proton beams and other particle beams generated by the equipment itself to achieve the purpose of killing tumor cells. For being able to treat a patient with an exact dosage at an exact location, first, the patient undergoes medical imaging in a positioning room, and a medical image is transmitted to a treatment plan system (TPS, also known as a TPS system). The patient's tumor is contoured by the TPS system based on the medical image. A treatment plan for the corresponding patient is produces by the TPS system based on the medical image and a tumor contour. The treatment plan is transmitted, by the TPS system, to an oncology information system (OIS, also known as an OIS system). The treatment plan is scheduled by the OIS system. A master computer of the radiotherapy equipment acquires a corresponding treatment plan in the OIS based on the patient information, and controls an imaging system of radiotherapy equipment to position the patient based on the treatment plan, and controls an radiation source of the radiotherapy equipment to generate beams to treat the patient after the positioning is completed.

The treatment plan is intended to control the radiotherapy equipment to generate beams to treat the patient. A complete treatment plan includes treatment plans of a plurality of radiation fields, each of the radiation fields covers a part of the patient's tumor region, and all of the radiation fields cooperate with each other, such that a dosage received by the patient's tumor region meets a treatment requirement. The treatment plan for each of the radiation field includes a position of a gantry, a position of each leaf in a multi-leaf collimator (MLC), a dosage percentage, a total dosage of a current field, and the like.

In the related art, one radiotherapy equipment only generates one type of rays. For example, a Gamma Knife only generates gamma rays, and a medical linear accelerator only generates X-rays. However, because each of the above radiotherapy equipment only produces one type of rays, a single type of rays is limited by the patient's tumor size and tumor type. Different tumor sizes and tumor types require different types of rays to be selected for treatment, thereby achieving better effect.

A treatment planning system is provided in some embodiments of the present disclosure. The treatment planning system is configured to acquire a mode selection instruction, a first image and contour data of target issue (referred to as contour data hereinafter). Before a subject to be treated is irradiated by using radiotherapy equipment, the first image is acquired by performing medical imaging on the subject to be treated using a medical imaging apparatus, such as computed tomography (CT) equipment or MRI device, in a positioning room. The purpose is to determine a location of a tumor based on the first image. After the first image is acquired, a target region and organ at risk in the first image is contoured, that is, contour data is generated by contouring concerned target tissue (for example, organs at risk and tumors) in the first image. Both the first image and the contour data are stored in corresponding storage spaces.

In some embodiments, the treatment planning system is configured to directly acquire the first image after the first image is generated by the CT equipment. Alternatively, the generated first image is stored in the storage space by the CT equipment, and the first image is acquired from the storage space by the treatment planning system when the first image is needed.

In some embodiments, the treatment planning system is configured to directly acquire corresponding contour data after the contouring system performs contouring. Alternatively, the contour data is stored by the contouring system in the corresponding storage space after the contouring is completed, and the contour data is acquired by the treatment planning system from the storage space when the contour data is needed. Alternatively, the first image is contoured by the treatment planning system itself (rather than the contouring system performs contouring), and then acquire the contour data that contouring by itself.

The mode selection instruction is an instruction input by a physician or radiotherapist through a human-machine interface or an external input device. The mode selection instruction is configured to select one of a plurality of treatment planning modes to produce a treatment plan. The physician or radiotherapist selects a corresponding treatment planning mode based on an actual situation of the subject to be treated. The plurality of treatment planning modes are configured to produce treatment plans for a plurality of treatment heads. The plurality of treatment heads are configured to generate different types of ray beams.

The plurality of treatment planning modes include a single treatment planning mode and a composite treatment planning mode. A plurality of types of treatment heads are configured to generate different types of rays, such as Gamma Knife treatment head, accelerator treatment head and proton beam treatment head. The single treatment planning mode is a mode for producing a treatment plan for one type of treatment head among the plurality of types of treatment heads. The composite treatment planning mode is a mode for producing a treatment plan for at least two types of treatment heads among the plurality of types of treatment heads.

As an example, a hospital purchases a plurality of radiotherapy equipment, including radiotherapy equipment with a separate Gamma Knife treatment head, radiotherapy equipment with a separate accelerator treatment head and radiotherapy equipment with a separate proton beam treatment head. The treatment plan produced based on the single treatment planning mode controls any kind of radiotherapy equipment to irradiate the subject to be irradiated. The treatment plan produced based on the composite treatment planning mode controls a plurality of radiotherapy equipment to sequentially irradiate the subject to be treated.

As another example, in the radiotherapy equipment purchased by the hospital, a plurality of treatment heads are arranged on one radiotherapy equipment, including a Gamma Knife treatment head, an accelerator treatment head and a proton beam treatment head. The treatment plan produced based on the single treatment planning mode controls any one of the treatment heads to irradiate the subject to be irradiated. The treatment plan produced based on the composite treatment planning mode controls at least two treatment heads to irradiate the subject to be irradiated simultaneously or alternately.

The treatment planning system is further configured to select, based on the mode selection instruction, a mode corresponding to the subject to be treated among the plurality of treatment planning modes upon acquiring the mode selection instruction, the first image and the contour data. The mode corresponding to the subject to be treated is a mode corresponding to a tumor size and tumor type of the current subject to be treated. By using the treatment plan produced based on the mode corresponding to the subject to be treated, tumor region is irradiated better and more accurately.

Upon selecting the corresponding mode corresponding to the subject to be treated, the treatment planning system is further configured to produce a treatment plan based on the mode corresponding to the subject to be treated, the first image and the contour data. For a plurality of radiotherapy equipment, including radiotherapy equipment with a separate Gamma Knife treatment head, radiotherapy equipment with a separate accelerator treatment head and radiotherapy equipment with a separate proton beam treatment head, a treatment plan for only one radiotherapy equipment or a treatment plan for at least two radiotherapy equipment are produced using one treatment planning system. In a case that a treatment plan for radiotherapy equipment with a plurality of treatment heads is produced, a treatment plan for the plurality of treatment heads are produced using only one treatment planning system, or treatment plans for respective treatment heads are produced using a plurality of treatment planning systems, each of the plurality of treatment planning systems being used for one treatment head, and finally a final treatment plan is acquired by combining the treatment plans produced by the plurality of treatment planning systems.

The treatment planning system provided in the embodiments of the present disclosure produces a treatment plan for a plurality of treatment heads that generate different types of ray beams. The treatment planning system is configured to acquire the mode selection instruction, the first image and the contour data, and then select, based on the mode selection instruction, the mode corresponding to the subject to be treated among the plurality of treatment planning modes, and finally produce the treatment plan based on the mode corresponding to the subject to be treated, the first image and the contour data. By selecting one of the plurality of treatment planning modes as the mode corresponding to the subject to be treated, the treatment plan produced based on the mode corresponding to the subject to be treated is adapted to the plurality of treatment heads that generate different types of ray beams. In this way, different types of rays generated by the plurality of treatment heads are adapted to tumors of different sizes and types simultaneously, thereby improving the accuracy of radiotherapy.

In some embodiments, the mode corresponding to the subject to be treated is the single treatment planning mode or the composite treatment planning mode.

In the case that the mode corresponding to the subject to be treated is the single treatment planning mode, the treatment planning system is configured to acquire the first image and the contour data, and produce a single treatment plan based on the first image and the contour data.

In the case that the mode corresponding to the subject to be treated is the composite treatment planning mode, with reference to FIG. 1 (FIG. 1 is a schematic diagram of a treatment planning system according to some embodiments of the present disclosure), a treatment planning system 100 includes a first planning system 110 and a second planning system 120. The first planning system 110 and the second planning system 120 produce treatment plans for treatment heads that generate different types of ray beams. In some embodiments, the first planning system 110 is a treatment planning system for the Gamma Knife treatment head, and the second planning system 120 is a treatment planning system for the accelerator treatment head. Alternatively, the first planning system 110 is a treatment planning system for the accelerator treatment head, and the second planning system 120 is a treatment planning system for the Gamma Knife treatment head. Alternatively, the first planning system 110 is a treatment planning system for the proton beam treatment head, and the second planning system 120 is a treatment planning system for the accelerator treatment head. The treatment heads corresponding to the first planning system 110 and the second planning system 120 are not limited in the embodiments of the present disclosure, as long as the first planning system 110 and the second planning system 120 are used for different types of treatment heads.

In the case that the mode corresponding to the subject to be treated is the composite treatment planning mode, the first planning system 110 and the second planning system 120 cooperate to produce a treatment plan. In a case that the treatment plan produced based on the composite treatment planning mode is in use, the treatment heads that generate different types of ray beams are controlled to emit beams simultaneously or alternately to irradiate the subject to be treated.

In some embodiments, the first planning system 110 is configured to acquire a first image and contour data, and produce a first treatment plan based on the first image and the contour data. In some embodiments, the first treatment plan is a single treatment plan, that is, a treatment plan only for Gamma Knife or only for accelerator. After the first treatment plan is produced, a dosage field of the first treatment plan is directly calculated, and both the dosage field and the first treatment plan are transmitted to the second planning system 120. Alternatively, the first treatment plan is transmitted to the second planning system 120, and the dosage field of the first treatment plan is calculated by the second planning system 120. The second planning system 120 is connected with the first planning system 110, and the second planning system 120 is configured to acquire the first treatment plan, the first image and the contour data, and produce a second treatment plan, on the basis of the first treatment plan, based on the first image and the contour data. Upon acquiring the dosage field of the first treatment plan, on the basis of the dosage field and the first treatment plan, the second treatment plan is produced by the second planning system 120 based on the first image and the contour data. In some embodiments, the second treatment plan is a single treatment plan, that is, a treatment plan only for Gamma Knife or only for accelerator. The first treatment plan and the second treatment plan are treatment plans for at least two treatment heads among the treatment heads that generate different types of ray beams.

In some embodiments, a treatment plan for Gamma Knife treatment head is produced by the first planning system 110, the treatment plan for Gamma Knife treatment head is transmitted by the first planning system 110 to the second planning system 120, and a treatment plan for accelerator treatment head is produced by the second planning system 120 on the basis of the treatment plan for Gamma Knife treatment head. Alternatively, a treatment plan for accelerator treatment head is produced by the first planning system 110, the treatment plan for accelerator treatment head is transmitted by the first planning system 110 to the second planning system 120, and a treatment plan for Gamma Knife treatment head is produced by the second planning system 120 on the basis of the treatment plan for accelerator treatment head.

Figure 2:
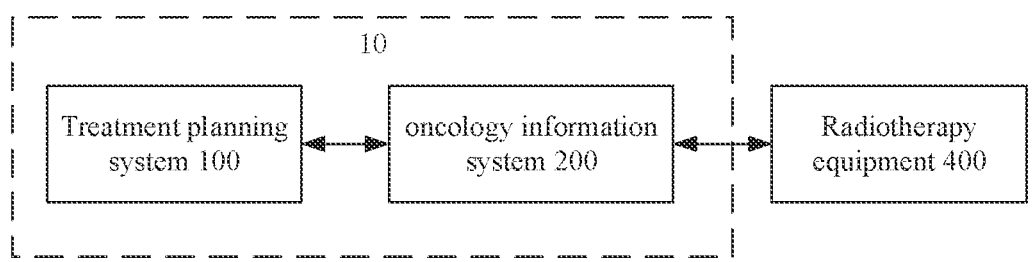
FIG. 2 is a schematic diagram of a radiotherapy system according to some embodiments of the present disclosure.

Based on the treatment planning system provided in the present disclosure, a radiotherapy system is provided. FIG. 2 is a schematic diagram of a radiotherapy system according to some embodiments of the present disclosure. As shown in FIG. 2, a radiotherapy system 10 is connected with radiotherapy equipment 400, and the radiotherapy equipment 400 includes a plurality of treatment heads (not shown in FIG. 2). At least two of the plurality of treatment heads are treatment heads capable of generating different types of rays. The plurality of treatment heads are two treatment heads, three treatment heads, or more treatment heads, which is not limited in the embodiments of the present disclosure. The treatment head is a Gamma Knife that produces gamma rays, or a medical linear accelerator that produces X-rays, or a treatment head that produces electron beams, proton beams and other particle beams. The type of the treatment head is not limited in the embodiments of the present disclosure, as long as at least two treatment heads generate different types of rays. The radiotherapy system 10 includes an oncology information system 200 and any treatment planning system 100 in the above embodiments. The treatment plan system (TPS) 100 is a system for calculating, based on a medical image of the subject to be treated, an absorbed dosage distribution of a region that needs to be irradiated in the medical image of the subject to be treated. The subject to be treated is a human body, a phantom, an animal, or the like. The oncology information system (OIS) is a system that realizes the structural and electronic storage and management of complete tumor medical record data, radiotherapy process optimization and quality control management.

In some embodiments, the treatment planning system 100 is connected with the oncology information system 200. For example, the treatment planning system 100 and the oncology information system 200 are connected in a wired or wireless manner, as long as data transmission is realized between the treatment planning system 100 and the oncology information system 200, which is not limited in the embodiments of the present disclosure.

The treatment planning system 100 is configured to produce a treatment plan for at least one treatment head of the radiotherapy equipment. The radiotherapy equipment 400 provided in the embodiments of the present disclosure is radiotherapy equipment with a plurality of treatment heads. During operation, the plurality of treatment heads operate simultaneously, or only one of the treatment heads operate alone, or several treatment heads operate cooperatively. Therefore, in a case that a treatment plan is produced by the treatment planning system 100, it is necessary to determine the current treatment plan requires how many treatment heads for irradiation treatment. The treatment planning system 100 has treatment planning modes corresponding to different numbers and different types of treatment heads. Based on the mode selection instruction, a single treatment plan for controlling one treatment head or a composite treatment plan for controlling a plurality of treatment heads is generated by the treatment planning system according to a mode corresponding to the mode selection instruction.

In some embodiments, the treatment planning system 100 includes two treatment heads, wherein the two treatments heads include one Gamma Knife treatment head and one accelerator treatment head. In this case, the treatment planning system 100 has three treatment planning modes. A first treatment planning mode is to only produce a treatment plan for the Gamma Knife treatment head, and in a case that this treatment plan is in use, only the Gamma Knife treatment head is controlled to irradiate the subject to be treated. A second treatment planning mode is to only produce a treatment plan for the accelerator treatment head, and in a case that this treatment plan is in use, only the accelerator treatment head is controlled to irradiate the subject to be treated. A third treatment planning mode is to produce a treatment plan for the Gamma Knife treatment head and the accelerator treatment head simultaneously, and in a case that this treatment plan is in use, the Gamma Knife treatment head and the accelerator treatment head are controlled simultaneously or alternately to irradiate the subject to be treated. The treatment plan generated in the third treatment planning mode is designed separately for the treatment plans corresponding to a plurality of treatment heads, and the treatment plans corresponding to the plurality of treatment heads are performed sequentially and continuously in use. Alternatively, the treatment plan generated in the third treatment planning mode is a composite treatment plan, wherein the composite treatment plan controls a plurality of treatment heads to generate ray beams simultaneously or alternately to irradiate the subject to be treated.

In some embodiments, the treatment plan is transmitted by the treatment planning system 100 to the oncology information system 200. The oncology information system 200 is connected with the radiotherapy equipment 400. For example, the oncology information system 200 and the radiotherapy equipment 400 are connected in a wired or wireless manner, as long as data transmission is realized between the oncology information system 200 and the radiotherapy equipment 400, and the connection manner is not limited in the embodiments of the present disclosure. Upon receiving the treatment plan, the treatment plan is scheduled by the oncology information system 200, such that the treatment plan is acquired by the radiotherapy equipment 400 and the subject to be treated is irradiated. The treatment time corresponding to the subject to be treated is produced and scheduled by the oncology information system based on the time when the treatment plan is transmitted to the system. Upon reaching the scheduled time, the subject to be treated enters the treatment room, and a treatment plan corresponding to the subject to be treated is acquired by the radiotherapy equipment 400 from the oncology information system 200, and the subject to be treated is irradiated by the radiotherapy equipment 400 based on the treatment plan.

The radiotherapy system 10 provided in the embodiments of the present disclosure controls the radiotherapy equipment 400 including a plurality of treatment heads, acquires the mode selection instruction, the first image and the contour data through the treatment planning system 100, and then select, based on the mode selection instruction, the mode corresponding to the subject to be treated among the plurality of treatment planning modes. Afterwards, the treatment planning system 100 produces a treatment plan based on the mode corresponding to the subject to be treated, the first image and the contour data, and transmits the treatment plan to the oncology information system 200. The oncology information system 200 schedules the treatment plan, such that the radiotherapy equipment 400 acquires the treatment plan and irradiates the subject to be treated. By selecting one of the plurality of treatment planning modes as the mode corresponding to the subject to be treated, the treatment plan produced based on the mode corresponding to the subject to be treated controls the radiotherapy equipment to irradiate the subject to be treated. That is to say, the radiotherapy equipment 400 with a plurality of treatment heads are controlled to irradiate. In this way, different types of rays generated by the plurality of treatment heads are simultaneously adapted to tumors of different sizes and types, thereby improving the accuracy of radiotherapy.

Figure 3:
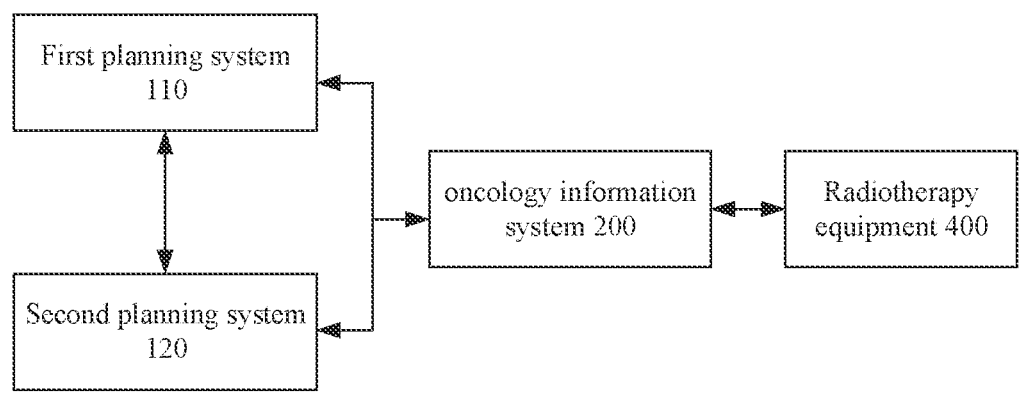
FIG. 3 is a schematic diagram of another radiotherapy system according to some embodiments of the present disclosure.

Referring to FIG. 3, FIG. 3 is a schematic diagram of another radiotherapy system according to some embodiments of the present disclosure. The treatment planning system 100 includes a first planning system 110 and a second planning system 120. The first planning system 110 and the second planning system 120 respectively produce a treatment plan for different treatment heads among the plurality of treatment heads of the radiotherapy equipment 400. The treatment heads corresponding to the first planning system 110 and the second planning system 120 are not limited in the embodiments of the present disclosure, as long as the first planning system 110 and the second planning system 120 are used for different types of treatment heads.

In some embodiments, the mode corresponding to the subject to be treated is a single treatment planning mode or a composite treatment planning mode.

In the case that the mode corresponding to the subject to be treated is the single treatment planning mode, the treatment plan produced based on the single treatment planning mode when in use only controls one treatment head in the radiotherapy equipment 400 to emit beams to irradiate the subject to be treated. In some embodiments, the first image and the contour data is acquired by the first planning system 110, and a single treatment plan is produced by the first planning system 110 based on the first image and the contour data. Alternatively, the first image and the contour data is acquired by the second planning system 120, and a single treatment plan is produced by the second planning system 120 based on the first image and the contour data. The single treatment plan is a treatment plan for any one of the plurality of treatment heads of the radiotherapy equipment 400. For example, the single treatment planning mode is a single Gamma Knife planning mode. In this case, a single Gamma Knife treatment plan is produced by the first planning system 110 based on the first image and the contour data. Alternatively, the single treatment planning mode is a single accelerator planning mode. In this case, a single accelerator treatment plan is produced by the second planning system 120 based on the first image and the contour data. It is understandable that the first planning system 110 is able to produce a single accelerator treatment plan, and the second planning system 120 is able to produce a single Gamma Knife treatment plan. Upon producing the single treatment plans, the single treatment plans are transmitted by the first planning system 110 and the second planning system 120 to the oncology information system 200.

In the case that the mode corresponding to the subject to be treated is the composite treatment planning mode, the first planning system 110 and the second planning system 120 cooperate to produce a treatment plan. Reference is made to the description of the composite treatment planning mode in the above embodiments, which is not repeated. The first planning system 110 is connected with the oncology information system 200 in a wired or wireless manner. The first treatment plan is transmitted by the first planning system 110 to the oncology information system 200. The second planning system 120 is connected with the oncology information system 200 and the first planning system 110 in a wired or wireless manner. The second treatment plan is transmitted by the second planning system 120 to the oncology information system 200. The first treatment plan and the second treatment plan are treatment plans for at least two treatment heads among the plurality of treatment heads of the radiotherapy equipment 400. Upon receiving the first treatment plan and the second treatment plan, the first treatment plan and the second treatment plan are scheduled simultaneously by the oncology information system 200. In this way, the radiotherapy equipment 400 is controlled by the oncology information system 200 to irradiate the subject to be treated based on the first treatment plan and the second treatment plan simultaneously.

In some embodiments, a treatment plan for a Gamma Knife treatment head is produced by the first planning system 110, the treatment plan for the Gamma Knife treatment head is transmitted by the first planning system 110 to the second planning system 120, and a treatment plan for an accelerator treatment head is produced by the second planning system 120 on the basis of the treatment plan for the Gamma Knife treatment head. Alternatively, a treatment plan for an accelerator treatment head is produced by the first planning system 110, the treatment plan for the accelerator treatment head is transmitted by the first planning system 110 to the second planning system 120, and a treatment plan for a Gamma Knife treatment head is produced by the second planning system 120 on the basis of the treatment plan for the accelerator treatment head.

In the embodiments of the present disclosure, the type of treatment plan suitable for the tumor to be treated is determined through the mode corresponding to the subject to be treated, and then the corresponding type of treatment plan is produced based on the first image and the contour data. In the case that a plurality of treatment heads need to be used, treatment plans for different types of treatment heads are generated through the treatment planning system. Operation of the plurality of treatment heads is controlled simultaneously or alternately through the treatment plans to be adapted to more tumor types. In this way, better treatment effects for patients are achieved, scope of indications for radiotherapy equipment is increased, and a richer selection of treatment modes is provided.

Figure 4:
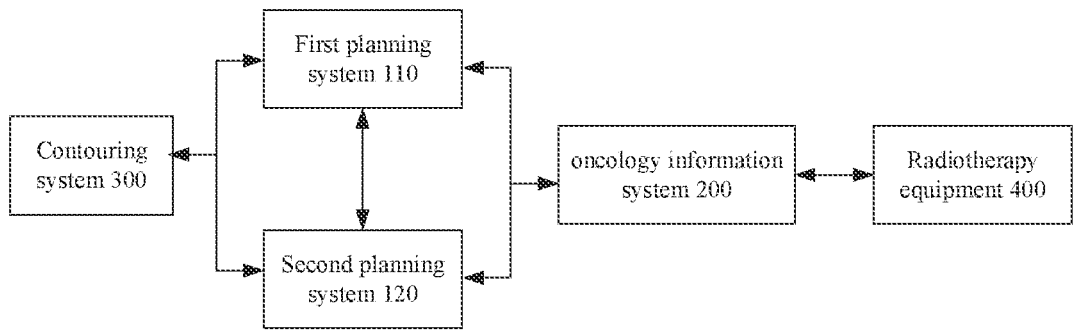
FIG. 4 is a schematic diagram of still another radiotherapy system according to some embodiments of the present disclosure.

Referring to FIG. 4, FIG. 4 is a schematic diagram of still another radiotherapy system according to some embodiments of the present disclosure. The radiotherapy system 10 further includes a contouring system 300. The contouring system 300 is configured to contour tissue, organs and tumors in an image. A physician or a radiotherapist performs contouring manually on a human-computer interface, or all the contours in the image are automatically contoured by an automatic contouring algorithm. The contouring system 300 is connected with the treatment planning system 100 in a wired or wireless manner. The contouring system 300 is configured to acquire the first image of the subject to be treated, and generate the contour data by contouring the first image. In a case that the contour data is needed to be used by the treatment planning system 100, the contour data is transmitted by the contouring system 300 to the treatment planning system 100. In some embodiments, all tissues, organs and tumors in the image are automatically contoured by the contouring system 300.

In the embodiments of the present disclosure, by automatically contouring the contour in the first image using the contouring system, workload of the physician is reduced, and the contouring accuracy is further improved.

Figure 5:
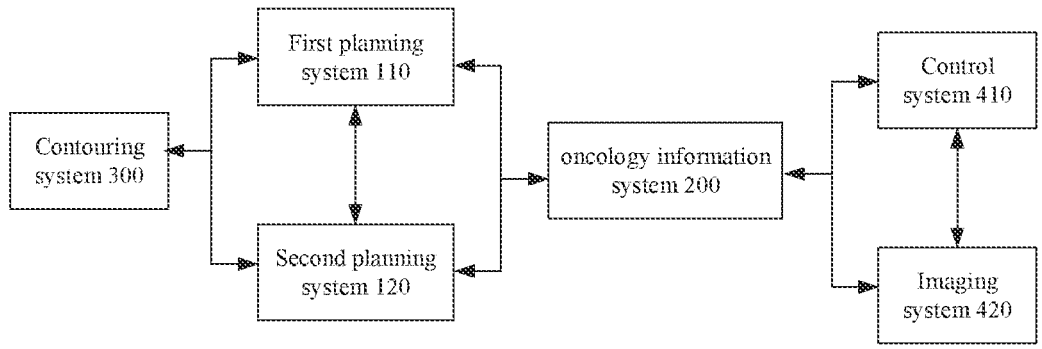
FIG. 5 is a schematic diagram of yet another radiotherapy system according to some embodiments of the present disclosure.

The oncology information system 200 schedules the received treatment plans. In the case that radiotherapy is required for the subject to be treated, the corresponding treatment plan is acquired by the radiotherapy equipment 400 from the oncology information system 200. In some embodiments, with reference to FIG. 5, FIG. 5 is a schematic diagram of yet another radiotherapy system according to some embodiments of the present disclosure. The radiotherapy equipment 400 includes a multi-treatment head equipment body (not shown in FIG. 5), a control system 410 and an imaging system 420. The multi-treatment head equipment body includes a base, a roller, a treatment bed and a plurality of treatment heads. The roller is fixed on the base. The plurality of treatment heads are arranged in sequence along the circumference of the roller. The treatment bed is configured to carry the subject to be treated and move the subject to be treated into or out of a treatment space formed by the roller. The plurality of treatment heads include at least two kinds of treatment heads among a Gamma Knife treatment head, an accelerator treatment head and a treatment head capable of generating other types of rays. The control system 410 is configured to control a move direction and speed of the roller of the multi-treatment head equipment body based on parameters of the treatment plan, and control the multi-treatment head to generate ray beams that conform to the treatment plan. For example, the ray beams conforming to the treatment plan include ray dosages conforming to the treatment plan, ray shapes conforming to the treatment plan, and the like. The imaging system 420 is configured to image the subject to be treated before or during treatment. In some embodiments, the imaging system 420 is medical imaging equipment such as CBCT.

The control system 410 is connected with the oncology information system 200 in a wired or wireless manner. The control system 410 is configured to acquire identification information of the subject to be treated. The identification information is configured to identify the subject to be treated. For example, the identification information includes at least one of the patient's name, the patient's ID card number, and the patient's registration number at the hospital, which is not limited in the embodiments of the present disclosure, as long as the unique subject to be treated is determined based on the identification information. Upon acquiring the identification information, the treatment plan corresponding to the identification information is acquired by the control system 410 from the schedule list of the oncology information system 200 based on the identification information. There is one or a plurality of corresponding treatment plans. All treatment plans corresponding to the identification information of the subject to be treated is needed to be acquired by the control system 410.

Upon acquiring the treatment plan, the identification information and the corresponding treatment plan are transmitted by the control system 410 to the imaging system 420. The imaging system 420 is connected with the control system 410 and the oncology information system 200 in a wired or wireless manner. The identification information and the treatment plan are acquired by the imaging system 420 from the control system 410. Upon acquiring the identification information, the first image and the contour data corresponding to the identification information are acquired by the imaging system 420 from the oncology information system 200 based on the identification information.

Upon acquiring the treatment plan, the first image and the contour data corresponding to the identification information, a second image of the subject to be treated is acquired by the imaging system 420. Registration parameters between the first image and the second image is determined by the imaging system 420 based on the first image, the second image, the contour data and the treatment plan. The registration parameters are translation parameters and deformation parameters between pixels in the two images. Afterwards, a movement parameter of the treatment bed is calculated by the imaging system 420 based on the registration parameters. The movement parameter of the treatment bed is a moving distance of the treatment bed when the part of the subject to be treated that needs to be irradiated moves to the radiation position of the treatment head. The registration parameters are transmitted by the imaging system 420 to the control system, and the movement parameter of the treatment bed is calculated by the control system based on the registration parameters. Alternatively, the movement parameter of the treatment bed is directly calculated by the imaging system 420 based on the registration parameters, and the movement parameter of the treatment bed is sent by the imaging system 420 to the control system.

In some embodiments, when the second image is acquired by the imaging system 420, a posture image and an image-guided protocol is acquired by the imaging system 420 from at least one treatment plan. The posture image is a posture generated by optical imaging when the patient takes the first image, wherein the posture includes a head-advanced posture or a foot-advanced posture. The image-guided protocol is a protocol for controlling the imaging system 420 to image the subject to be treated, wherein the image-guided protocol includes a current parameter, a voltage parameter, a half-scan mode, a full-scan mode, and the like. After acquiring the posture image, the physician guides the subject to be treated to lie on the treatment bed in the same body position. A second image is acquired, by the imaging system 420, by imaging the subject to be treated based on the image-guided protocol, and a contour of the tumor is acquired by contouring the second image by the imaging system 420. A registration result, that is, the registration parameters, is acquired by registering the second image with the first image by the imaging system 420.

In one of the embodiments, the control system 410 is configured to control the multi-treatment head equipment body to posture the subject to be treated based on the registration parameters. After acquiring the registration parameters, the movement parameter of the treatment bed is calculated by the control system 410 based on the registration parameters. Or what the control system 410 receives is the movement parameter of the treatment bed calculated by the imaging system 420 based on the registration parameters. The control system 410 is configured to control the treatment bed to move the same distance based on the movement distance represented by the movement parameter of the treatment bed to posture the subject to be treated. The control system 410 is configured to control the multi-treatment head equipment body to irradiate the subject to be treated based on the treatment plan after the posturing is completed. In the case that one treatment plan is produced, the control system 410 is configured to control the treatment head corresponding to the treatment plan to generate beams. In the case that a plurality of treatment plans are produced, the control system 410 is configured to perform the corresponding treatment plans sequentially based on the order in which the treatment plans are produced, that is, the corresponding treatment heads are sequentially controlled to generate beams.

The radiotherapy system provided in the embodiments of the present disclosure is configured to produce treatment plans for a plurality of treatment heads and control radiotherapy equipment with a plurality of treatment heads through a corresponding treatment plan. A better treatment effect for patients is achieved by providing a plurality of treatment modes. For example, the plurality of treatment modes include head stereotactic radiotherapy, body stereotactic radiotherapy, intensity-modulated radiotherapy, multi-mode (multi-treatment head) coordinated radiotherapy, and the like. And further, the scope of indications of the radiotherapy equipment is increased, such that one radiotherapy equipment is adopted to treat a plurality of indications at the hospital, further reducing the cost of building radiotherapy departments in hospitals.

In some embodiments, the treatment planning system, the oncology information system and the contouring system mentioned in the embodiments of the present disclosure are all built on a computer device. Each system is built on its own computer device, or a plurality of systems are built on the same computer device. Moreover, the first planning system and the second planning system in the treatment planning system are configured on two computer devices respectively, or are configured on one computer device. The computer device is a personal terminal device or a server.

Figure 6:
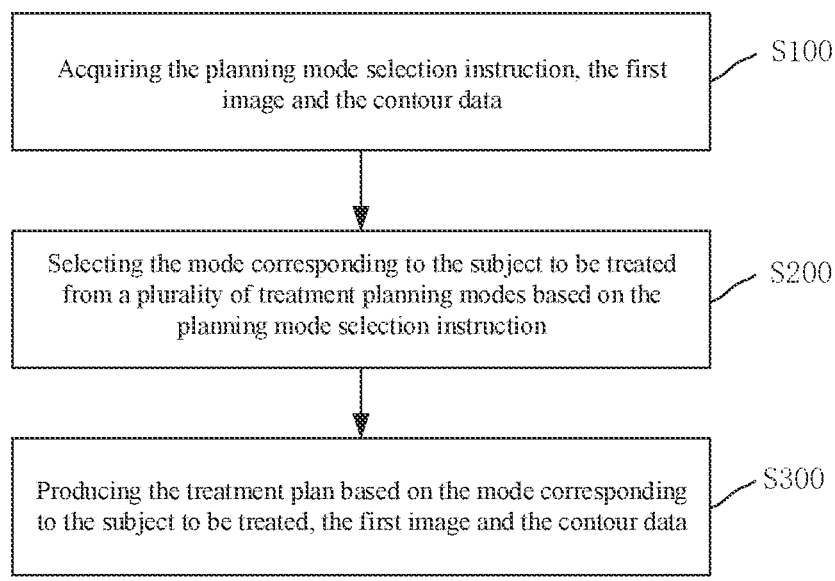
FIG. 6 is a flowchart of a method for treatment planning according to some embodiments of the present disclosure.

A method for treatment planning is provided in the embodiments of the present disclosure. The method is applicable to the treatment planning system described in the above embodiments. FIG. 6 is a flowchart of a method for treatment planning according to some embodiments of the present disclosure. As shown in FIG. 6, the method includes the following processes S100 to S300.

In S100, the mode selection instruction, the first image and the contour data are acquired.

In S200, the mode corresponding to the subject to be treated is selected, based on the mode selection instruction, from the plurality of treatment planning modes.

In S300, the treatment plan is produced based on the mode corresponding to the subject to be treated, the first image and the contour data.

In some embodiments, in the case that the mode corresponding to the subject to be treated is the single treatment planning mode, in S300, a single treatment plan is produced based on the first image and the contour data. The single treatment plan is a treatment plan for any one of a plurality of treatment heads of radiotherapy equipment.

In some embodiments, in the case that the mode corresponding to the subject to be treated is the composite treatment planning mode, in S300, a first treatment plan is produced based on the first image and the contour data, and a second treatment plan is produced, on the basis of the first treatment plan, based on the first image and the contour data. The first treatment plan and the second treatment plan are treatment plans for at least two treatment heads among the plurality of treatment heads of the radiotherapy equipment.

In the embodiments of the present disclosure, the detailed description of the method for treatment planning is the same as the treatment planning system in the above embodiments, and reference is made to the detailed description of the treatment planning system in the above embodiments, which is not repeated herein.

It should be noted that the processes shown above or in the flowchart of the accompanying drawings are performed in a computer system in some embodiment, wherein the computer system is capable of loading and executing a set of computer-executable instructions. Although a logical order is shown in the flowchart, the processes shown or described are performed in an order different from that presented here in some cases.

An apparatus for treatment planning is provided in the embodiments of the present disclosure. The apparatus is configured to implement the above embodiments and preferred implementations, and those that have been described are repeated. As used below, the term "module," "unit," "subunit" or the like is a combination of software and/or hardware that realize a predetermined function in some embodiments. Although the apparatus described in the following embodiments is preferably implemented in software, implementations in hardware or a combination of software and hardware are also possible and contemplated.

Figure 7:
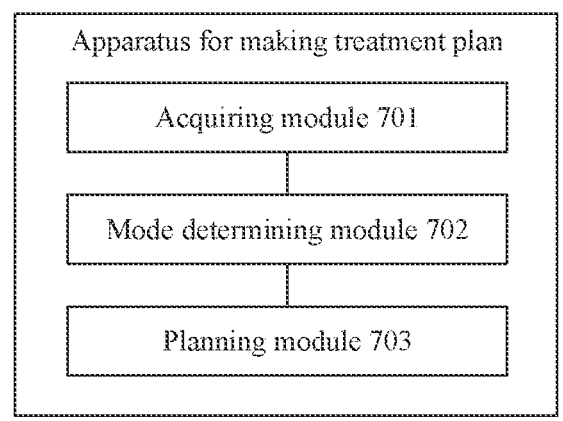
FIG. 7 is a block diagram of a structure of an apparatus for treatment planning according to some embodiments of the present disclosure.

FIG. 7 is a block diagram of a structure of an apparatus for treatment planning according to some embodiments of the present disclosure. As shown in FIG. 7, the apparatus includes an acquiring module 701, a mode determining module 702 and a planning module 703.

The acquiring module 701 is configured to acquire a mode selection instruction, a first image and contour data.

The mode determining module 702 is configured to select, based on the mode selection instruction, a mode corresponding to the subject to be treated from a plurality of treatment planning modes.

The planning module 703 is configured to produce a treatment plan based on the mode corresponding to the subject to be treated, the first image and the contour data.

The planning module 703 is further configured to produce a single treatment plan based on the first image and the contour data in a case that the mode corresponding to the subject to be treated is a single treatment planning mode. The single treatment plan is a treatment plan for any one of a plurality of treatment heads of radiotherapy equipment.

The planning module 703 is further configured to produce a first treatment plan based on the first image and the contour data in a case that the mode corresponding to the subject to be treated is a composite treatment planning mode, and produce a second treatment plan, on the basis of the first treatment plan, based on the first image and the contour data. The first treatment plan and the second treatment plan are treatment plans for at least two treatment heads among the plurality of treatment heads of the radiotherapy equipment.

It should be noted that each of the above modules is a functional module or a program module, and is realized by software or by hardware. For the modules implemented by hardware, the above modules are disposed in the same processor; or the above modules are disposed in different processors in any combination.

A radiotherapy system is provided in the embodiments of the present disclosure. The radiotherapy system includes a treatment plan system (TPS), an oncology information system (OIS), a treatment control system (TCS) and an image guided system (IGS), wherein the four systems operate together to drive a radiotherapy equipment to irradiate a patient and record radiotherapy data during treatment. The treatment plan system (TPS), the oncology information system (OIS) and the treatment control system (TCS) are software systems that are built on a computer device, wherein the computer device is a personal terminal or a server. The image guided system (IGS) includes imaging equipment including hardware equipment such as x-ray tubes, and the software system of the imaging system.

Before a patient is treated using the radiotherapy system, the patient enters the radiotherapy department of the hospital. Patient registration is performed. For example, the patient registers at the nurse station, and a nurse enters the patient information on the OIS client. After the information is entered, a positioning scan is performed on the patient through the CT equipment. After the positioning scan is completed, the patient's CT positioning image is sent by the CT equipment to the TPS.

After the CT positioning image is received by the TPS, based on the patient ID registered by the nurse on the OIS, a physicist produces a treatment plan for the patient on the TPS. The treatment plan is made at least in the following two manners.

Manner 1: CT positioning images are acquired by two TPSs, and the CT positioning images are contoured by the two TPS systems, either automatically or manually. In some embodiments, the CT positioning images are contours by the TPS, or the CT positioning images are sent to the contouring system before the CT positioning images are sent to the TPS, and the CT positioning images are contoured by the contouring system, and then the CT positioning images and the contouring result are sent to the TPS. After the contouring result is acquired, a Gamma Knife treatment plan is made by the first planning system based on the contoured CT positioning image, the corresponding dosage field is calculated by the first planning system, and the Gamma Knife treatment plan is sent by the first planning system to the OIS. The Gamma Knife treatment plan is stored in the corresponding patient by the OIS. The Gamma Knife treatment plan is sent by the first planning system to the second planning system, an accelerator treatment plan is made by the second planning system based on the dosage field, the Gamma Knife treatment plan, the CT image and the contour, and then the accelerator treatment plan is sent by the second planning system to OIS. The treatment plan includes treatment plan information, CT positioning images and contour information.

Manner 2: one TPS is configured to support radiotherapy equipment including at least two treatment heads, and one TPS is configured to produce a treatment plan. Different fields in the treatment plan are classified into two types, one is the accelerator field, and the other is the Gamma Knife field. Through one treatment plan, at least two treatment heads are controlled simultaneously to generate different radiation fields and use different types of rays, and complete the double-head treatment plan. The double-head treatment plan is sent to OIS.

After the treatment plan is completed by the TPS, the treatment plan is sent by the TPS to the OIS, and a patient's setup image and an image-guided protocol are added through the OIS. After the treatment plan is approved, the treatment plan is scheduled.

The patient's double-head plan is loaded by the TCS from the OIS, and the treatment plan information in the treatment plan is acquired by the TCS. The CT positioning image, setup image, contour data and image-guided protocol in the treatment plan are acquired by the IGS. The patient is setup by the IGS based on the CT positioning image, the contour data, the setup image and image-guided protocol. Six-dimensional bed movement amount of the radiotherapy equipment is determined by the IGS, and the six-dimensional bed movement amount is sent by the IGS to the TCS. The bed is moved by the TCS based on the six-dimensional bed movement amount. After the bed movement is completed by the TCS, the patient is irradiated based on the treatment plan. In a case that the treatment plan is a treatment plan produced in manner 1 above, the corresponding treatment plans are performed sequentially based on an order in which the plurality of treatment plans are made. For example, during a process of producing a treatment plan, a Gamma Knife treatment plan is made first, and then an accelerator treatment plan is made based on the Gamma Knife treatment plan. In a case that the treatment plan is performed, the Gamma Knife treatment plan is first performed to treat the patient with radiotherapy, and then the accelerator treatment plan is performed to treat the patient with radiotherapy. In a case that the treatment plan is the treatment plan produced in manner 2 above, the patient is irradiated by the TCS based on the double-head treatment plan. After the treatment is completed, the treatment record is sent back to OIS.

Figure 8:
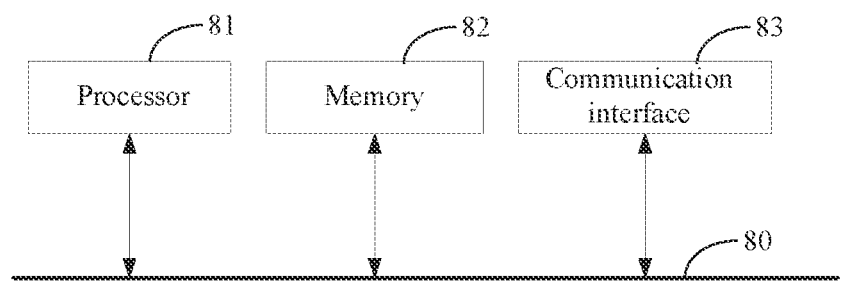
FIG. 8 is a schematic diagram of a hardware structure of a computer device according to some embodiments of the present disclosure.

In some embodiments, the method for treatment planning in the embodiments of the present disclosure described in conjunction with FIG. 6 is performed by a computer device. FIG. 8 is a schematic diagram of a hardware structure of a computer device according to some embodiments of the present disclosure.

The computer device includes a processor 81 and a memory 82 storing one or more computer program instructions.

Specifically, the above processor 81 includes a central processing unit (CPU), or an application specific integrated circuit (ASIC), or one or more integrated circuits which are configured to perform the embodiments of the present disclosure.

The memory 82 includes a large-capacity memory for data or one or more instructions. By way of example and not limitation, the memory 82 includes a hard disk drive (HDD), a floppy disk drive, a solid state drive (SSD), a flash memory, an optical disk, a magneto-optical disk, a magnetic tape or a universal serial bus (USB) drive or a combination of two or more of the above. In some embodiments, the memory 82 includes removable or non-removable (or fixed) medium. The memory 82 is internal or external to the computer device. In a specific embodiment, the memory 82 is a non-volatile memory. In a specific embodiment, the memory 82 includes a read-only memory (ROM) and a random access memory (RAM). The ROM is a mask-programmed ROM, a programmable ROM (PROM), an erasable PROM (EPROM), an electrically erasable PROM (EEPROM), an electrically alterable ROM (EAROM) or a flash memory (FLASH) or a combination of two or more of these. The RAM is a static random-access memory (SRAM) or a dynamic random-access memory (DRAM). The DRAM is a fast page mode dynamic random access memory (FPMDRAM), an extended data out dynamic random access memory (EDODRAM), a synchronous dynamic random access memory (SDRAM), or the like.

The memory 82 is configured to store or cache various data files that need to be processed and/or communicated, as well as one or more possible computer program instructions performed by the processor 81.

The processor 81 loads and executes the one or more computer program instructions stored in the memory 82 to perform the method for treatment planning in the any of above embodiments.

In some of these embodiments, the computer device further includes a communication interface 83 and a bus 80. As shown in FIG. 8, the processor 81, the memory 82 and the communication interface 83 are connected through the bus 80 to complete mutual communication.

The communication interface 83 is configured to realize communication between modules, apparatuses, units and/or devices in the embodiments of the present disclosure. In some embodiments, the communication port 83 also realizes data communication with other components such as external devices, image/data acquiring devices, databases, external storage and image/data processing workstations.

The bus 80 includes hardware, software, or both, and the bus 80 is configured to couple the components of the computer device to each other. The bus 80 includes but is not limited to at least one of the following: a data bus, an address bus, a control bus, an expansion bus and a local bus. By way of example and not limitation, the bus 80 includes an accelerated graphics port (AGP) or other graphics bus, an extended industry standard architecture (EISA) bus, a front side bus (FSB), a hyper transport (HT) interconnect, an industry standard architecture (ISA) bus, an InfiniBand interconnect, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronics standards association local bus (VLB) or other suitable buses or a combination of two or more of these. The bus 80 includes one or more buses. Although the embodiments of the present disclosure describe and illustrate a particular bus, any suitable bus or interconnect is contemplated in the present disclosure.

The computer device performs the method for treatment planning in the embodiments of the present disclosure based on the acquired computer instructions, thereby realizing the method for treatment planning described in conjunction with FIG. 6.

In some embodiments, the computer device provided in the embodiments of the present disclosure includes two memories and two processors. The first memory stores a computer program corresponding to the first planning system, and the first processor loads and executes the computer program stored in the first memory. The second memory stores a computer program corresponding to the second planning system, and the second processor loads and executes the computer program stored in the second memory.

In addition, in combination with the method for treatment planning in the above embodiments, a non-transitory computer-readable storage medium is provided in the embodiments of the present disclosure. One or more computer program instructions are stored in the non-transitory computer-readable storage medium. The one or more computer program instructions, when loaded and executed by a processor, causes the processor to perform the method for treatment planning in any of the above embodiments.

In some embodiments, the technical features in the above embodiments are combined arbitrarily. For the purpose of a concise description, all possible combinations of the technical features in the above embodiments are not all described, as long as there is no contradiction among the combinations of these technical features, they all should be within the scope of the description.

The above embodiments only express several implementations of the present disclosure, and descriptions of these embodiments are specific and detailed, but cannot therefore be interpreted as the restriction to the scope of the present disclosure. It should be noted that those skilled in the art can make several modifications and improvements without departing from the concept of the present disclosure, and these all belong to the protection scope of the present disclosure. Therefore, the protection scope of the present disclosure is based on appended claims.

What is claimed is:

1. A treatment planning system, comprising:
one or more first processors; and
a first non-transitory computer-readable medium storing a plurality of first instructions;
wherein an execution of the plurality of first instructions by the one or more first processors is configured to:
acquire a mode selection instruction, a first image of a subject to be treated, and contour data of a target tissue;
select, based on the mode selection instruction, a mode corresponding to the subject to be treated from a plurality of treatment planning modes, wherein the plurality of treatment planning modes is configured to produce treatment plans for a plurality of treatment heads that generate different types of ray beams; and
produce a treatment plan based on the mode corresponding to the subject to be treated, the first image of the subject to be treated, and the contour data of the target tissue.

2. The treatment planning system according to claim 1, wherein
the plurality of treatment planning modes comprises a single treatment planning mode and a composite treatment planning mode;
wherein the single treatment planning mode is configured to produce a treatment plan for one treatment head, and the composite treatment planning mode is configured to produce a treatment plan for the plurality of treatment heads that generate different types of ray beams.

3. The treatment planning system according to claim 2, wherein
in a case that the mode corresponding to the subject to be treated is the composite treatment planning mode, the execution of the plurality of first instructions by the one or first more processors is further configured to acquire the first image of the subject to be treated and the contour data of the target tissue, and produce a first treatment plan based on the first image of the subject to be treated and the contour data of the target tissue;
wherein, in the case that the mode corresponding to the subject to be treated is the composite treatment planning mode, the execution of the plurality of first instructions by the one or more first processors is further configured to acquire the first treatment plan, the first image of the subject to be treated, and the contour data of the target tissue, and produce a second treatment plan, on a basis of the first treatment plan, based on the first image of the subject to be treated and the contour data of the target tissue; and
wherein the first treatment plan and the second treatment plan are treatment plans for at least two treatment heads among the plurality of treatment heads that generate different types of ray beams.

4. A radiotherapy system, comprising: an oncology information system and the treatment planning system as defined in claim 1, wherein
the execution of the plurality of first instructions by the one or more first processors is further configured to:
produce a treatment plan for at least one of a plurality of treatment heads of radiotherapy equipment,
the oncology information system comprises:
one or more second processors; and
a second non-transitory computer-readable medium storing a plurality of second instructions, wherein an execution of the plurality of second instructions by the one or more second processors is configured to:
schedule the treatment plan for at least one of the plurality of treatment heads of the radiotherapy equipment;
wherein the oncology information system is connected with the radiotherapy equipment, and the radiotherapy equipment is configured to irradiate the subject to be treated based on the treatment plan.

5. The radiotherapy system according to claim 4, further comprising a contouring system, wherein the contouring system comprises:
one or more third processors; and
a third non-transitory computer-readable medium storing a plurality of third instructions, wherein an execution of the plurality of third instructions by the one or more third processors is configured to:
acquire the first image of the subject to be treated, and generate the contour data of the target tissue by contouring the first image of the subject to be treated.

6. The radiotherapy system according to claim 4, wherein the radiotherapy equipment comprises: a multi-treatment head equipment body, a control system, and an imaging system; wherein
the execution of the plurality of first instructions by the one or more first processors is further configured to:
using the control system, acquire identification information of the subject to be treated, and acquire a treatment plan corresponding to the identification information from a schedule list of the oncology information system based on the identification information;
using the imaging system, acquire the identification information and the treatment plan for at least one of the plurality of treatment heads of the radiotherapy equipment, and acquire the first image of the subject to be treated corresponding to the identification information and the contour data of the target tissue from the oncology information system based on the identification information;
using the imaging system, acquire a second image of the subject to be treated, determine registration parameters between the first image of the subject to be treated and the second image of the subject to be treated based on the first image of the subject to be treated, the second image of the subject to be treated, the contour data of the target tissue, and the treatment plan for at least one of the plurality of treatment heads of the radiotherapy equipment, and transmit the registration parameters to the control system; and
using the control system, control, based on the registration parameters, the multi-treatment head equipment body to position the subject to be treated, and control, based on the treatment plan for at least one of the plurality of treatment heads of the radiotherapy equipment, the multi-treatment head equipment body to irradiate the subject to be treated.

7. A method for treatment planning, the method comprising:
acquiring a mode selection instruction, a first image of a subject to be treated, and a contour data of a target tissue;
selecting, based on the mode selection instruction, a mode corresponding to the subject to be treated from a plurality of treatment planning modes, wherein the plurality of treatment planning modes is configured to produce treatment plans for a plurality of treatment heads that generate different types of ray beams; and
producing a treatment plan based on the mode corresponding to the subject to be treated, the first image of the subject to be treated, and the contour data of the target tissue.

8. The method according to claim 7, wherein producing the treatment plan based on the mode corresponding to the subject to be treated, the first image of the subject to be treated, and the contour data of the target tissue comprises:
producing a single treatment plan based on the first image of the subject to be treated, and the contour data of the target tissue, in a case that the mode corresponding to the subject to be treated is a single treatment planning mode, wherein the single treatment plan is a treatment plan for any one of a plurality of treatment heads of radiotherapy equipment.

9. The method according to claim 7, wherein producing the treatment plan based on the mode corresponding to the subject to be treated, the first image of the subject to be treated, and the contour data of the target tissue comprises:
producing a first treatment plan based on the first image of the subject to be treated and the contour data of the target tissue, in a case that the mode corresponding to the subject to be treated is a composite treatment planning mode; and
producing a second treatment plan, on a basis of the first treatment plan, based on the first image of the subject to be treated and the contour data of the target tissue;

wherein the first treatment plan and the second treatment plan are treatment plans for at least two treatment heads among a plurality of treatment heads of radiotherapy equipment.

10. A computer device, comprising: a memory, a processor, and a computer program stored in the memory and executable on the processor, wherein the processor, when loading and executing the computer program, is caused to perform the method for treatment planning as defined in claim 7.

11. A non-transitory computer-readable storage medium storing a computer program therein, wherein the computer program, when loaded and executed by a processor, causes the processor to perform the method for treatment planning as defined in claim 7.

* * * * *